384-289 333 SE
F3SEE 05 SE 7,418
BEST AVAILABLE COPY

Morris & McCreary.

Pulley Lubricator.

No. 3,418. Reissued May 4, 1869.

Witnesses,
John Powers
Arthur E. Ashburg

Inventors,
Geo M. Morris
John McCreary

United States Patent Office.

GEORGE M. MORRIS AND JOHN McCREARY, OF COHOES, NEW YORK.

*Letters Patent No. 74,116, dated February 4, 1868; reissue No. 3,418, dated May 4, 1869.*

IMPROVED LUBRICATOR FOR LOOSE PULLEYS.

The Schedule referred to in these Letters Patent and making part of the same.

*To all whom it may concern:*

Be it known that we, GEORGE M. MORRIS and JOHN McCREARY, of Cohoes, in the county of Albany, and State of New York, have invented new and useful Improvements in Lubricators for Loose Pulleys, and other wheels, for which Letters Patent were granted to us, bearing date the 4th day of February, 1868, which Letters Patent have been surrendered and cancelled, by reason of a defective specification, and that the following is a true and exact description of our said invention, reference being had to the accompanying drawings, forming part of this specification, in which—

Figure 1:
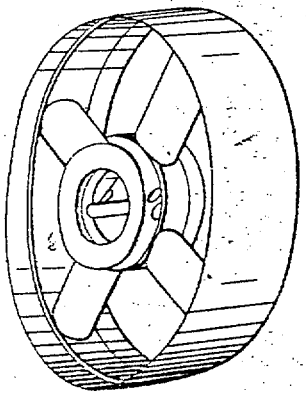
Figure 2:
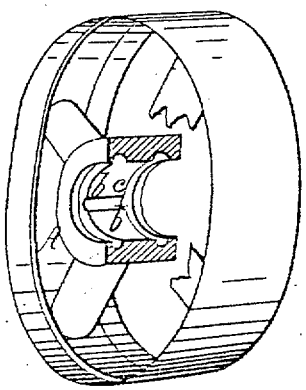
Figure 3:
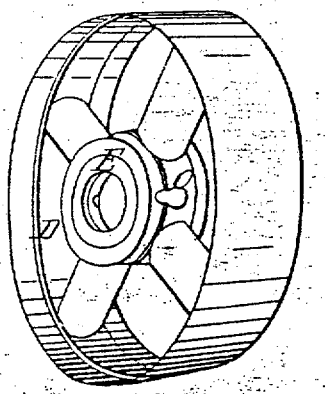
Figure 4:
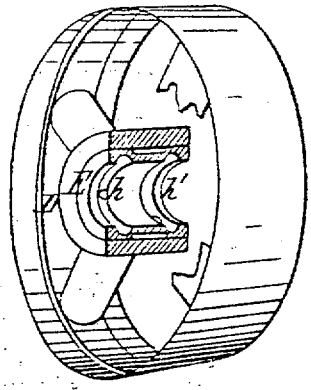
Figure 6:
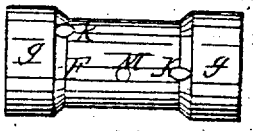
Figure 5:
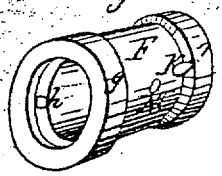
Figure 7:
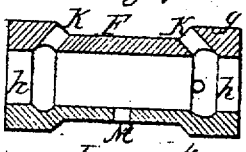

Figure 1 represents the hub of a loose pulley, without a bushing, and containing our invention;

Figure 2, a longitudinal section of said hub;

Figure 3, a hub with a bushing, containing our invention;

Figure 4, a longitudinal section of said hub and bushing;

Figures 5 and 6 are views of said bushing, showing the interior and exterior apertures, through which the oil passes; and Figure 7 is a section of said bushing, showing the passages from the inner grooves to the outer chamber.

Similar letters of reference indicate corresponding parts.

The object of our invention is to save the oil used to lubricate loose pulleys, or other wheels revolving on a fixed axle, by the formation, in the hubs of said pulleys, or wheels, or in the bushings fitted into such hubs, of grooves or channels, substantially as hereinafter set forth.

Said invention has no relation to journal-boxes, or other stationary device, in which axles or shafts revolve.

When a bushing is used, the invention consists in providing channels around the outer and inner surfaces of said bushing, and in connecting them with each other, in such a manner that the oil can flow from the outer channel to the shaft, and that the same will, when it reaches the end of the bushing, be collected into interior grooves, whence it returns into the outer channel.

Where no bushing is used, the interior of the hub is grooved, to form channels for the retention of the oil.

A represents the hub of a loose pulley, or other wheel, to which our invention is applied.

*b b* are two grooves, near the ends of the hub, and passing entirely around the interior of the same.

*c* is a longitudinal groove or channel, connecting the grooves *b b*.

The operation of this device is as follows:

The oil is introduced through the aperture at *o*.

As it is carried, by the motion of the wheel, towards the ends of the hub, it is caught and retained in the circular grooves *b b*.

Thence it flows into the channel *c*, and falls again upon the shaft, thus effecting a most important saving of oil.

In a hub or loose pulley, which contains no bushing, one or more longitudinal grooves or channels, C, may be employed, without the annular grooves *b b*.

In that case, the oil, as it falls from the shaft, will be collected in the said groove or grooves, and, as the hub or pulley revolves, will fall therefrom upon the shaft, without the employment of any other device to effect or facilitate its return to the said shaft.

D represents the hub of a loose pulley, or other wheel, having within it the bushing E.

The outer surface of the bushing contains a chamber, F, extending almost from end to end of the bushing, the said channel being enclosed by shoulders, *g*, formed on the ends of the bushing.

Within the interior surface of the bushing are formed grooves *h h*, one near each end thereof.

By means of holes *k k*, the grooves *h* are connected with the chamber F, and the latter is connected with the inner full surface of the bushing, by means of a hole, *m*.

The chamber F receives its supply of oil through a hole, *o*, which may be closed by means of a screw-plug, or otherwise, if desired.

When the pulley is hung upon a shaft, so that the end of the hole *m* leads directly to the surface of the shaft, the oil, contained in the chamber F, will flow upon and lubricate the shaft through the hole *m*.

As the oil is being carried to either end of the bushing, it will be collected in the grooves *h h*, whence it will return, through the holes *k*, to the chamber F.

Thus, no oil is allowed to escape at the ends of the bushing, and the saving, by the use of our invention, is very great.

The grooves *h h* may, if desired, be arranged spirally, or even lengthwise, in the inner surface of the bushing.

We claim as new, and desire to secure by Letters Patent—

1. Providing the interior of a loose pulley, or other wheel, revolving upon a shaft or axle, with one or more longitudinal grooves, C, as and for the purposes herein specified and described.

2. The annular grooves *b b*, in combination with the longitudinal groove C, within the hub of a loose pulley, or other wheel, revolving upon a shaft or axle, substantially as and for the purposes herein shown and described.

3. Also, the bushing E, within the hub of the loose pulley, constructed as described, having the chamber F, around its periphery, communicating with the shaft by means of the opening *m*, the shoulders *g*, of said bushing, fitting snugly within the hub, and provided with the annular grooves *h h*, communicating with the shaft and chamber F, by means of the openings *k k*, substantially in the manner and for the purposes herein shown and specified.

In witness whereof, we have hereunto set our hands, this 21st day of April, 1868.

GEO. M. MORRIS.
JOHN McCREARY.

Witnesses:
JOHN POWERS,
ARTHUR E. ASHDOWN.